Patented June 11, 1929.

1,716,749

UNITED STATES PATENT OFFICE.

BAILEY F. WILLIAMSON, OF GAINESVILLE, FLORIDA, ASSIGNOR TO STONE HOMES PROCESS, INCORPORATED, OF GAINESVILLE, FLORIDA, A CORPORATION OF FLORIDA.

BUILDING MATERIAL.

No Drawing. Application filed July 23, 1923. Serial No. 653,375.

This invention relates to the production of artificial stone but more particularly such as is suitable for use in building construction and has for its primary object to provide a new and improved material for this purpose.

Further objects of my invention are to produce a stone which has sufficient toughness to prevent cracking of the walls, to provide a stone which is practically free from gritty material and is capable of being easily cut with an ordinary saw, to provide a form of stone capable of having nails driven therein or withdrawn therefrom substantially as with wood, to produce a building material which is substantially impervious to moisture, and to provide a form of artificial stone which continues to harden after the initial setting.

In carrying out my invention, I employ as the cementing agent, a combination of hydraulic (preferably Portland) cement and slaked lime. The material which I have successfully used as an aggregate is Florida shell rock, which contains over 95% $CaCO_3$, as will be readily understood by reference to a work entitled "A preliminary report on the limestones and marls of Florida" by Stewart Mossom, assistant State geologist, and taken from the Sixteenth Annual Report of the Florida State Geological Survey, reference being made particularly to pages 40, 41 and 45 of this report.

The aggregate ingredient is prepared by preferably subjecting the rock to an ordinary crushing operation which will permit all of the material to pass through a screen of two inch mesh. It is not essential to use any special care in grading the rock, although a better and more economical mix is secured if the material which will pass through a one inch mesh sieve averages approximately ninety (90) per cent of the aggregate.

The crushed rock, the cement and the slaked lime are preferably mixed together in a dry condition before the water is added, sufficient water being used to produce a semi-liquid mass which may be readily poured into forms. If an ordinary concrete or cement mixer is used, a proper mixing can be effected in a minute or less. Also by reason of the rock having substantially the same specific gravity as the liquid in which it is carried, it will not settle down in the mix, which can be made much more fluid than is ordinarily considered practical. The enhanced fluidity of the mix greatly increases the range and efficiency of the towers or other equipment used for pouring or distributing the mix and materially lessens the expense and time consumed.

The mass will set in a few hours and become sufficiently hard in 24 hours to permit the forms to be removed. Monolithic walls or buildings may be constructed from this material, or, if desired, blocks of the material may be made by suitable machinery and used in the same manner as tile or ordinary concrete blocks.

The stone made in this manner contains large numbers of small air pockets which prevent dampness from passing through. Walls constructed from the material, either monolithically or with blocks, do not require the use of furring strips and lath as the plaster may be applied directly upon the inner surface of the wall without fear of trouble due to penetration of moisture or sweating. This porous condition and the slight elasticity of the stone prevent cracking of the walls due to expansion and contraction. The porosity of the stone is possible, in some measure, due to the formation of small pockets of steam or other gas formed by the slaking or hydration action of the water in converting the calcium oxide into calcium hydrate.

After the stone has set, nails may be driven into and withdrawn from the same as readily as with wood. There is no gritty material in the mass so that openings for windows and doors may be sawed out with an ordinary hand saw. Blocks of this stone may be readily cut into slabs in the same manner. After the primary setting, the stone continues to harden, due to absorption of atmospheric $CO_2$ which converts the calcium hydrate into the carbonate.

As a specific example of a formula for a composition which can be depended upon to give excellent results, I may use Crushed Florida shell rock, 90% by weight.

Ground slaked lime, 5% by weight.

Portland cement, 5% by weight.

These figures may be varied in accordance with the character or degree of fineness of the particular rock aggregate which is used, and in certain instances the percentage of the cementitious ingredients may be lowered considerably if the rock is properly sized or graded so as to produce a minimum per cent of voids. Also the use to which the material is to be put, the character of the exposure and the moisture resistivity desired will determine to a considerable extent the percentage of cementitious material which is necessary to suit the particular case.

For all ordinary purposes, it may be stated as a general, although not necessarily an infallible rule, that the proportion of rock should be between 80% and 95%, with the remainder cementitious material, and as to the cementitious material the relative proportions of hydraulic cement and lime should preferably be as follows:

Cement 1 part.
Lime 1 to 3 parts.

A building may be constructed of my artificial stone on practically the same basis of cost as wood and it possesses all the advantageous features of concrete, brick or natural stone. Furthermore, it has the additional advantage of improving in strength with age.

The described details of the process and ingredients illustrate merely one phase of my invention, the scope of which is to be determined by reference to the appended claim, said claim being construed as broadly as possible, consistent with the state of the art.

I claim as my invention:

Building material which in set condition is nail-penetrable and capable of being sawed, comprising Florida shell rock containing substantially 95% $CaCO_3$ and in crushed condition such that approximately 90% thereof will pass through a screen of between a one-inch and a two-inch mesh, and a binder including lime and hydraulic cement, each comprising 5% to 15% of the entire mixture.

BAILEY F. WILLIAMSON.